United States Patent [19]

Beland

[11] 4,113,062
[45] Sep. 12, 1978

[54] DEVICE FOR CHANGING THE FORCE ACTING ON A REVERSIBLY ROTATABLE SHAFT

[75] Inventor: Stig Gösta Bele Beland, Södertälje, Sweden

[73] Assignee: Gränges Essem Aktiebolag, Vesteras, Sweden

[21] Appl. No.: 765,282

[22] Filed: Feb. 3, 1977

[30] Foreign Application Priority Data

Feb. 3, 1976 [SE] Sweden .................................. 7601103

[51] Int. Cl.² ..................... B65H 75/42; B65H 75/48; F03G 1/08
[52] U.S. Cl. ........................................ 185/10; 242/107
[58] Field of Search ................ 185/9, 10, 37; 242/107

[56] References Cited

U.S. PATENT DOCUMENTS

| | | | |
|---|---|---|---|
| 2,835,344 | 5/1958 | Allen | 185/37 |
| 3,194,343 | 7/1965 | Sindlinger | 185/10 |
| 3,337,155 | 8/1967 | Binding | 242/107 |
| 3,984,063 | 10/1976 | Knieriemen | 242/107 |

*Primary Examiner*—James L. Jones, Jr.
*Assistant Examiner*—K. J. Ramsey
*Attorney, Agent, or Firm*—Browdy and Neimark

[57] ABSTRACT

A device is provided for changing the force acting on a spring operated reversibly rotatable shaft. The spring is arranged to be tensioned during the rotation of the shaft in one direction and then provides the rotation of the shaft in the opposite direction. The device comprises a rotatably mounted means which is arranged to be actuated by a second spring, and a gear reduction device which is inserted between the shaft and the rotatable means. The gear reduction device causes the rotatable means to rotate less than one revolution during the whole rotation of the shaft in one direction. The second spring is arranged to provide an additional force on the shaft over the gear reduction device.

7 Claims, 2 Drawing Figures

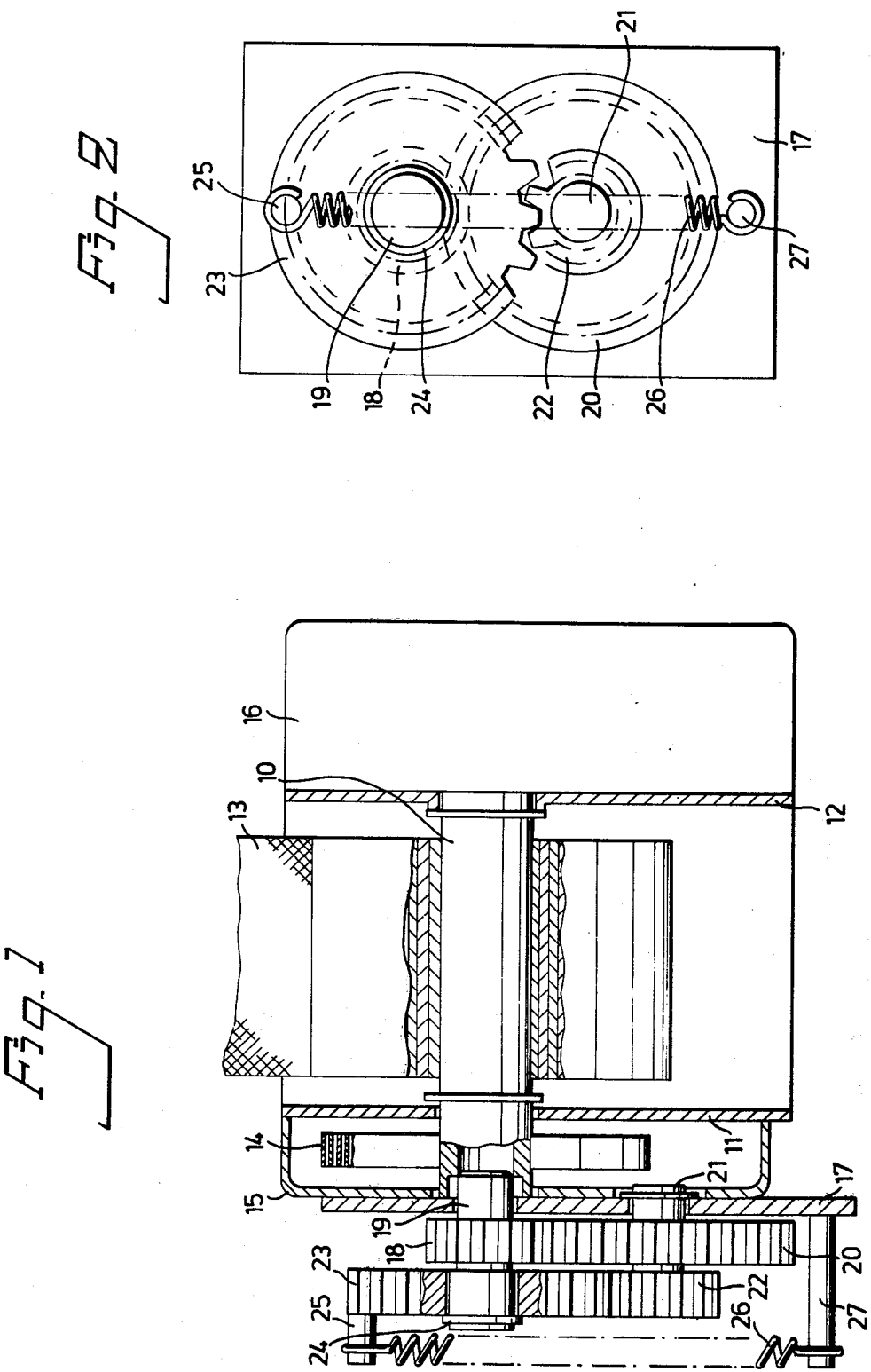

DEVICE FOR CHANGING THE FORCE ACTING ON A REVERSIBLY ROTATABLE SHAFT

The present invention relates to a device for changing the force acting on a reversibly rotatable shaft connected with a spring which is arranged to be tensioned during the rotation of the shaft in one direction and which then provides the rotation of the shaft in the opposite direction. The device is particularly useful in facilities for winding up safety belts in vehicles but can also be used for many other purposes.

Safety belts for vehicles, particularly motor vehicles, are generally designed for automatic retraction, at least partly, of the safety belt into a cover, when the safety belt is not in use. This is normally provided by winding up a strap of the safety belt on a spindle which is caused to rotate by means of a helical spring which has been tensioned sufficiently by the rotation of the spindle during the extraction of the strap.

Safety belts of the type normally in use now have an important drawback due to the fact that the force exerted by the spring on the strap of the seat belt successively increases, when the strap is withdrawn or extracted from the spindle and the spring is tensioned. This is due to the fact that the shaft of the spindle is directly connected with the helical spring and that the spring tension successively increases, when the spindle rotates during the extraction of the strap. In this context, a contributing factor is that the diameter of the strap coil successively decreases during the extraction of the strap which brings the lever between the extraction point for the strap and the shaft to successively decrease. Thus, the force in the strap provided by the spring is small in the beginning of the extraction operation and then becomes larger and larger. When the seat belt is in use, the larger portion of the strap is extracted and, then, the force in the strap provided by the spring has reached such a large value that the seat belt provides a comparatively strong pressure over the chest of the person embraced by the seat belt. This pressure is uncomfortable for the person embraced by the seat belt, and this is an important reason for the fact that frequently safety belts are not used during driving. Therefore, it is highly desirable to decrease or eliminate the discomfort frequently caused by the use of the present safety belts.

The problem described above cannot be solved by decreasing the force in the strap provided by the spring, because a not too small force is necessary for winding up the last piece of the strap portion which is to be wound up on the spindle. The spring in conventional retraction devices for seat belts are for this reason normally pretensioned.

The object of the invention is to provide a device which makes it possible to change the total force acting on the shaft or spindle in a desirable way with regard to the range of application. This purpose has been obtained according to the invention by giving the device the features set forth in claim 1.

One embodiment of a device according to the invention will be described in detail below with reference to the attached drawings.

FIG. 1 is a side view, partly in section, of a winding up device for a strap of a safety belt for motor vehicles which has been provided with a device according to the invention.

FIG. 2 is a schematic end view of the device shown in FIG. 1.

The device shown in FIG. 1 for winding up a strap of a seat belt comprises a spindle 10 which is rotatably journalled in two walls 11, 12 of the cover of the winding up device. A strap 13 of the seat belt is wound on the spindle, and the figure shows the device when a portion of the strap is wound on the spindle, i.e. a state during extraction or retraction of the strap. The winding up of the strap on the spindle is provided by a spring 14 which is shown attached to the spindle 10 at its one end. The spring is to some extent tensioned, as a portion of the strap is wound on the spindle. The spring is enclosed in a cap 15 attached to the winding up device. The opposite end of the spindle 10 is provided with a device (not shown) for locking the spindle, so that the strap cannot be further extracted from the winding up device in case of a hard braking or a collision and a person embraced by the seat belt is firmly held. This locking device is enclosed in a cap 16 attached to the winding up device.

The device forming the invention is shown as an additional device on the left side of FIG. 1. This device comprises a base plate 17 which is attached to the cap 15 of the winding up device. On the base plate 17 a first gear wheel 18 is provided which is mounted on a rotatable shaft 19 which extends through the base plate and is rigidly connected with the spindle 10, so that the shaft 19 always rotates in the same way as the spindle 10. The gear wheel 18 has a comparatively small diameter and is arranged to drive a second gear wheel 20 having substantially larger diameter, so that a gear reduction of the spindle is provided. The gear wheel 20 is mounted on a shaft 21 which is rotatably journalled in the base plate 17 and partly extends into an opening in the cap 15. A third gear wheel 22 is mounted on the shaft 21 in such a way that it always rotates with the shaft. The gear wheel 22 has a substantially smaller diameter than the gear wheel 20 and engages with a fourth gear wheel 23 having a larger diameter, so that a further gear reduction of the rotation of the spindle is provided. The gear wheel 23 is rotatably mounted on the shaft 19 and kept on the shaft by means of a locking washer 24. All the gear wheels are provided with external gear rings.

The gear wheel 23 is provided with a holder 25, extending away from the winding up device, for one end of a coil spring 26, which is a draw spring. The other end of the coil spring is attached to a holder 27 attached to the base plate 17.

FIG. 2 shows schematically the base plate 17 and the gear wheels 18, 20, 22 and 23 and the spring 26. The figure will mainly be used in connection with the following description of the operation of the additional device.

The device shown in FIGS. 1 and 2 operates in the following way. When the strap is withdrawn from the winding up device, the spindle 10 rotates and the helical spring 14 is tensioned. At the same time the gear wheels 18, 20, 22 and 23 rotate, the gear change between the spindle and the last gear wheel being such that this wheel only rotates less than one revolution during the whole rotation movement of the spindle in one and the same direction. FIG. 2 shows the position of the gear wheels, when the spindle has rotated about half the maximum number of revolutions in one and the same direction. In this position, when the strap is withdrawn from the coil on the spindle, the gear wheel 23 rotates clockwise in FIG. 2, and when the helical spring provides winding up of the strap on the spindle, the gear wheel 23 rotates counter clockwise. In the position shown in FIG. 2, which position corresponds to a position about halfway between the end positions, the holder 25 for one end of the spring is positioned on a straight line with the other holder 27 and the centre lines of the two shafts 19 and 21. The coil spring 26, which is attached between the holders 25 and 27 and which is a draw spring, as mentioned above, will for this reason not exert any turning force on the gear wheel 23 and, consequently, no force on the spindle 10. However, when more strap is withdrawn from the coil, the gear wheel 23 will rotate clockwise and the holder 25 will then be moved away from the straight line through the holder 27 and the centre lines of the shafts 19 and 21, so that the spring attached between the holders 25 and 26 will exert a turning or rotating force on the gear wheel 23 which tends to turn this gear wheel in the direction in which the gear wheel rotates, when the strap is withdrawn from the winding up device. The action of the draw spring 26 will thus facilitate the further extraction of the strap and will thus counteract the action of the helical spring 14. On the other hand, when the strap is wound on the spindle due to the action of the helical spring 14, the gear wheel 23 will rotate counter clockwise, so that the draw spring 26 will exert a force on the gear wheel tending to rotate this wheel in the direction in which the gear wheel rotates during retraction of the strap into the winding up device. The action of the draw spring 26 will in this case facilitate the winding up of the strap on the spindle and the draw spring will thus cooperate with the helical spring 14, because the force from the draw spring is transferred over the gearing wheels to the spindle. The arrangement of the draw spring 26 in the way described above will thus give the result that the resultant force on the spindle in the retraction direction will be larger in the beginning of the strap extraction and less in the end of the extraction than if only the helical spring 14 was used, as is the case in the present winding up devices. Due to the increase of the force in the beginning of the extraction, the advantage is obtained that the retraction of the strap into the winding up device is more forceful during the last part of the retraction than what should otherwise be the case. Due to the decrease of the force in the end of the extraction, the advantage is obtained that the discomfortable pressure from the seat belt on the person embraced by the seat belt is to a high extent decreased.

In a normal winding up device for safety belts in motor vehicles it is reasonable to assume that the spindle will rotate about 16 revolutions in one and the same direction during an extraction or a retraction of the strap. The point in which the force from the draw spring 26 changes direction should then preferably be obtained when the spindle has rotated about eight revolutions from one of the end positions.

Even if only one embodiment of the invention has been described and shown it is evident that a number of modifications and variations are possible within the invention. For instance, the point in which the additional force from the second spring changes direction in winding up devices for seat belts can be positioned somewhere else than halfway between the end positions. This can easily be provided by adjusting the gear wheel having the spring holder in another relationship with the spindle or by changing the position of the holder on the gear wheel. The strength of the additional spring can be altered within wide limits, but it is important to make sure that the force exerted by the additional spring on the spindle is not larger than the force exerted by the helical spring 14 during the intervals, when the forces counteract each other, because otherwise the strap cannot be retracted into the winding up device due to the action of the spring 14. The number and shape of the gear wheels can also be varied within wide limits, and internal as well as external gear rings can be used. Furthermore, also other gear reduction devices which do not consist or only partly consist of gear wheels can be used. The last gear wheel of the transmission chain, which is provided with a holder for the spring of the additional device, must not necessarily be a complete gear wheel but can be a turnable means which can have an arbitrary shape and which is provided with teeth only along a portion of its outer or inner periphery.

When the invention is used in connection with other devices than winding up devices for safety belts, the additional spring can be positioned in such a way that the additional force operates the whole time in the same direction and the whole time either counteracts or cooperates with another spring. Such applications are possible for instance in spring motors.

What is claimed is:

1. Device for changing the force gradient acting on a reversibly rotatable shaft connected with a spring which is arranged to be tensioned during the rotation of the shaft in one direction and which then provides the rotation of the shaft in the opposite direction, comprising
    a rotatably mounted means, a second spring to actuate said rotatable means,
    a gear reduction device which is connected between the shaft and the rotatable means, said gear reduction device connecting the shaft with the rotatable means to cause the rotatable means to rotate less than one revolution during the whole rotation of the shaft in one direction, the second spring being arranged to provide an additional force on the shaft by way of the gear reduction device, and
    means for causing the additional force from the second spring during a portion of the rotation of the shaft in one direction to act in opposite direction to the force from the first spring and during the rest of the rotation of the shaft to act in the same direction as the force from the first spring.

2. Device according to claim 1, particularly for spindles in winding up devices for vehicle seat belts, comprising means to cause the second spring to provide an additional force on the shaft in the same direction as the force from the first spring, when this is in its comparatively untensioned state, and to provide an additional force on the shaft in opposite direction to the force from the first spring, when this is in its tensioned state, the additional force on the shaft going down to zero and changing direction during the rotation of the shaft in one direction.

3. Device according to claim 2, comprising means to position the second spring to the rotatable means so that the additional force changes direction, when the shaft has rotated about half the total number of revolutions in one direction.

4. Device according to claim 1, characterized in that the gear reduction device comprises a number of gear wheels (18, 20, 22, 23) which are arranged to cooperate in a transmission line, the first gear wheel (18) in the transmission line being rigidly connected with the shaft

(10) and the last gear wheel (23) in the transmission line forming the rotatable means.

5. Device according to claim 4, characterized in that the second spring (26) has its one end attached to the rotatable means (23) and its other end attached to a fixed point (27).

6. Device according to claim 1, characterized in that the second spring is a coil spring.

7. Device according to claim 6, characterized in that the coil spring (26) is a draw spring.